United States Patent
Cho et al.

(10) Patent No.: US 7,953,383 B2
(45) Date of Patent: May 31, 2011

(54) DUAL BAND RECEIVER

(75) Inventors: Sang Do Cho, Gyunggi-Do (KR); Sang Hyun Cho, Daejeon (KR); Jin Ho Ko, Daejeon (KR); Hak Sun Kim, Daejeon (KR); Yoo Sam Na, Seoul (KR)

(73) Assignees: Samsung Electro-Mechanics Co., Ltd., Suwon (KR); Phychips, Inc., Daejeon (KR)

( * ) Notice: Subject to any disclaimer, the term of this patent is extended or adjusted under 35 U.S.C. 154(b) by 467 days.

(21) Appl. No.: 12/191,775

(22) Filed: Aug. 14, 2008

(65) Prior Publication Data

US 2009/0124221 A1 May 14, 2009

(30) Foreign Application Priority Data

Nov. 12, 2007 (KR) .................. 10-2007-0115088

(51) Int. Cl.
*H04B 1/06* (2006.01)
(52) U.S. Cl. .................... 455/260; 455/209; 455/323
(58) Field of Classification Search .............. 455/207, 455/209, 255–260, 313, 323, 334, 338–341
See application file for complete search history.

(56) References Cited

U.S. PATENT DOCUMENTS

| 6,081,691 | A | 6/2000 | Renard et al. |
| 6,215,988 | B1 * | 4/2001 | Matero ................ 455/188.1 |
| 6,256,511 | B1 * | 7/2001 | Brown et al. ........... 455/552.1 |
| 6,424,817 | B1 * | 7/2002 | Hadden et al. ............ 455/3.02 |
| 6,484,038 | B1 * | 11/2002 | Gore et al. ............. 455/552.1 |
| 7,035,613 | B2 | 4/2006 | Dubash et al. |
| 7,079,596 | B1 * | 7/2006 | Namura .................... 375/324 |
| 7,197,089 | B2 | 3/2007 | Najarian |
| 2005/0079849 | A1 | 4/2005 | Na et al. |
| 2006/0176215 | A1 | 8/2006 | Dubash et al. |

FOREIGN PATENT DOCUMENTS

| DE | 69620433 | 11/2002 |
| EP | 0529183 | 3/1993 |
| JP | 2002-122649 A | 4/2002 |
| KR | 20050034966 A | 4/2005 |
| KR | 10-2005-01100239 A | 11/2005 |

OTHER PUBLICATIONS

German Office Action for Application No. 10 2008 036 641.2 mailed Mar. 3, 2011.

* cited by examiner

*Primary Examiner* — Nhan Le
(74) *Attorney, Agent, or Firm* — Lowe, Hauptman, Ham & Berner, LLP

(57) ABSTRACT

There is provided a dual band receiver receiving frequency signals in different bands, the receiver including: a first down converter converting a first band signal into a first intermediate frequency signal; a second down converter converting a second band signal into a second intermediate frequency signal; a first voltage control oscillator supplying a first oscillation frequency to the first down converter; a second voltage control oscillator supplying a second oscillation frequency to the second down converter; a first filter passing the first intermediate frequency signal within a desired bandwidth; a second filter passing the second intermediate frequency signal within a desired bandwidth; and a clock generator converting the first oscillation frequency of the first voltage control oscillator into sampling frequencies corresponding to integer multiples of first and second oscillation frequencies and supplying the sampling frequencies to first and second AD converters, respectively.

12 Claims, 2 Drawing Sheets

DUAL BAND RECEIVER

CROSS-REFERENCE TO RELATED APPLICATIONS

This application claims the priority of Korean Patent Application No. 2007-0115088 filed on Nov. 12, 2007, in the Korean Intellectual Property Office, the disclosure of which is incorporated herein by reference.

BACKGROUND OF THE INVENTION

1. Field of the Invention

The present invention relates to a dual band receiver, and more particularly, to a dual band receiver that can receive an L1 band frequency signal in a GPS and an L5 band frequency signal in a Galileo system at the same time.

2. Description of the Related Art

A global positioning system (hereinafter, referred to as a "GPS") has been developed by the United States Department of Defense to read a position. The GPS receives signals from a plurality of satellites and accurately reads the position on the earth. The GPS may include a satellite unit, a user unit, and a control unit. The satellite includes a plurality of satellites. The user unit receives messages from the satellites, calculates a current position, and uses data appropriate for the purpose. The control unit analyzes the signals from the satellites and controls the position of each of the satellites.

The current GPS uses frequency signals in the L1 band (1575.42 MHz) and the L2 band (1227.6 MHz).

A different system that reads a position on the earth may include a Galileo system used in Europe. The Galileo system uses a frequency signal in the L5 band (1176.45 MHz).

It is known that the Galileo system has smaller errors than the GPS.

At the moment, the GPS and Galileo system are being used in different regions. However, since the two systems may be used in the same region in the future, studies on theses systems have been conducted.

SUMMARY OF THE INVENTION

An aspect of the present invention provides a receiver that can receive an L1 band frequency signal used in a GPS and an L5 band frequency signal used in a Galileo system at the same time.

According to an aspect of the present invention, there is provided a dual band receiver receiving frequency signals in different bands, the receiver including: a first down converter converting a first band signal into a first intermediate frequency signal; a second down converter converting a second band signal into a second intermediate frequency signal; a first voltage control oscillator supplying a first oscillation frequency to the first down converter; a second voltage control oscillator supplying a second oscillation frequency to the second down converter; a first filter passing the first intermediate frequency signal within a desired bandwidth; a second filter passing the second intermediate frequency signal within a desired bandwidth; and a clock generator converting the first oscillation frequency of the first voltage control oscillator into sampling frequencies corresponding to integer multiples of first and second oscillation frequencies and supplying the sampling frequencies to first and second AD converters, respectively.

The first band signal may be an L1 band frequency signal used in a global positioning system (GPS), and the second band signal may be an L5 band frequency signal used in a Galileo system.

The L1 band frequency signal may be at 1540×1.023 MHz, and the L5 band frequency signal may be at 1150×1.023 MHz.

One of the first intermediate frequency and the second intermediate frequency may equal to an integer multiple of the other intermediate frequency.

The first oscillation frequency is at 1536×1.023 MHz, and the second oscillation frequency is at 1162×1.023 MHz.

The first intermediate frequency is 4×1.023 MHz, and the second intermediate frequency is at 12×1.023 MHz.

The clock generator may include a first frequency dividing unit generating a sampling frequency to be input to the first AD converter; and a second frequency dividing unit generating a sampling frequency to be input to the second AD converter.

The second frequency dividing unit may form a part of the first frequency dividing unit.

The first frequency dividing unit may include a first frequency divider, a second frequency divider, and a third frequency divider sequentially connected to each other, and the second frequency dividing unit may include the first frequency divider and the second frequency divider.

The first frequency divider may have a frequency division ratio of 1/2, the second frequency divider may have a frequency division ratio of 1/16, and the third frequency divider may have a frequency division ratio of 1/3 or 1/1.

The first intermediate frequency may be at 4×1.023 MHz, and the second intermediate frequency may be at 12×1.023 MHz; and the clock generator may include the first, second, and third frequency dividers sequentially connected to each other, the first to third frequency dividers may generate a sampling frequency input to the first AD converter, and the first and second frequency dividers may generate a sampling frequency input to the second AD converter. The first frequency divider may have a frequency division ratio of 1/2, the second frequency divider has a frequency division ratio of 1/16, and the third frequency divider may have a frequency division ratio of 1/3 or 1/1.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
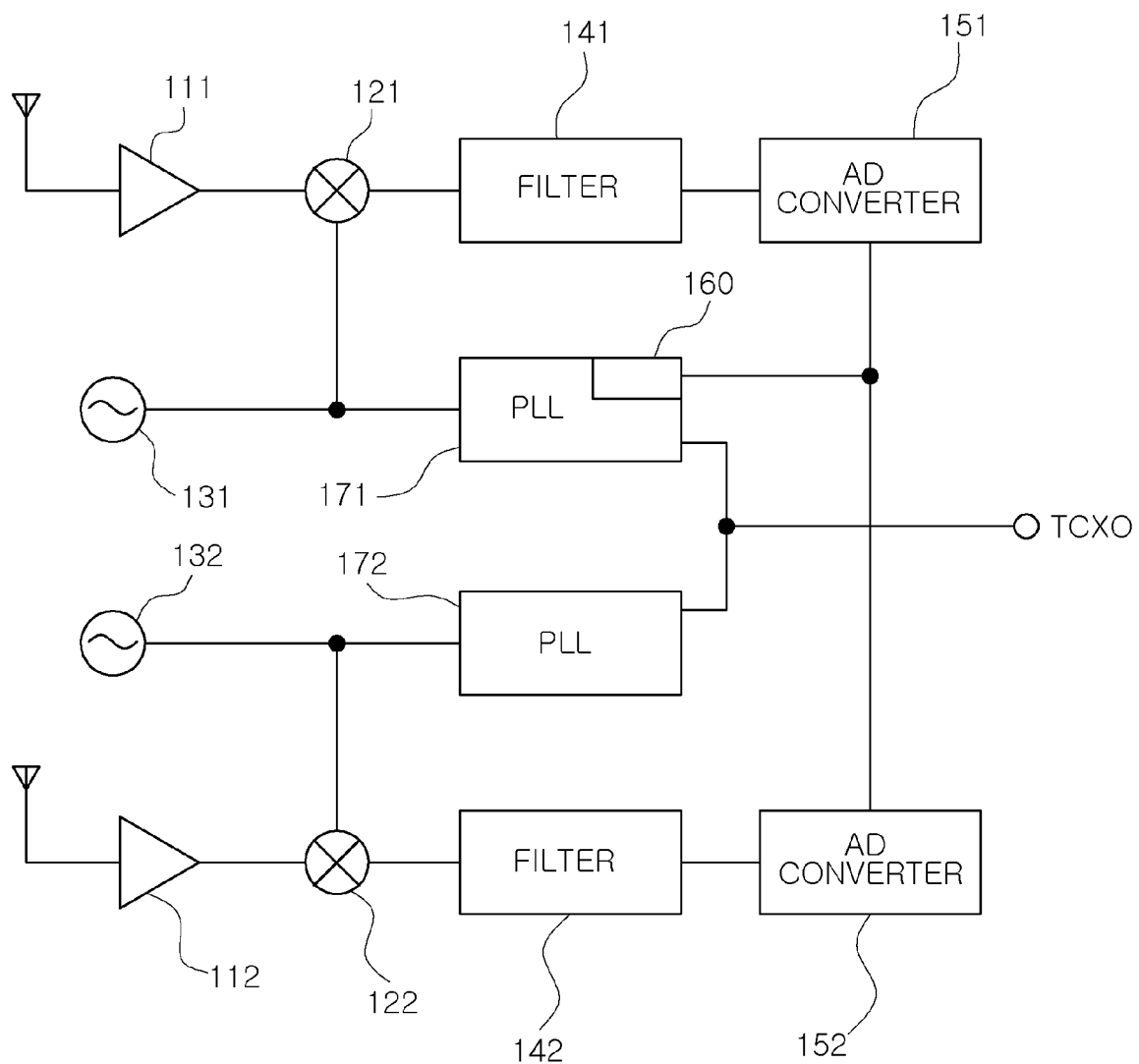
FIG. 1 is a circuit diagram illustrating a dual band receiver according to an exemplary embodiment of the present invention.

FIG. 1 is a circuit diagram illustrating a dual band receiver according to an exemplary embodiment of the present invention.

Referring to FIG. 1, a dual band receiver 100 according to this embodiment may include first and second down converters 121 and 122, first and second voltage control oscillators 131 and 132, first and second band-pass filters 141 and 142, first and second analog-to-digital (AD) converters 151 and 152, and a clock generator 160.

The first down converter 121 may convert a first band signal passing through a first low noise amplifier 111 into a first intermediate frequency.

The first down converter 121 may obtain a difference between the first band signal passing through the first low noise amplifier 111 and an oscillation signal generated from the first voltage control oscillator 131 and output the first intermediate frequency on the basis of the difference.

In this embodiment, the first band signal may be an L1 band frequency signal at 1575.42 MHz that is used in a GPS. The L1 band frequency signal may be indicated as $1540f_0$. Here, $f_0$ may be 1.023 MHz.

At this time, when the first voltage control oscillator 131 supplies a signal of $1536f_0$ to the first down converter 121, the first down converter 121 subtracts the oscillation signal from the first voltage control oscillator 131 from the signal passing through the first low noise amplifier 111 to thereby obtain an intermediate frequency (IF) of $4f_0$.

The second down converter 122 can convert a second band signal passing through the second low noise amplifier 112 into a second intermediate frequency.

The second down converter 122 obtains a difference between the second band signal passing through the second low noise amplifier 112 and an oscillation signal generated from the second voltage control oscillator 132 and outputs the second intermediate frequency on the basis of the difference.

In this embodiment, the second band signal may be an L5 band frequency signal at 1176.45 MHz that is used in a Galileo system. The L5 band frequency signal may be indicated as $1150f_0$. Here, $f_0$ may be 1.023 MHz.

At this time, when the second voltage control oscillator 132 supplies a signal of $1162f_0$ to the second down converter 122, the second down converter 122 subtracts the oscillation signal from the second voltage control oscillator 132 from the signal passing through the second low noise amplifier 112 to thereby obtain an intermediate frequency (IF) of $12f_0$.

In this embodiment, different voltage control oscillators are used to convert the first and second band signals into the first and second intermediate frequencies, respectively. That is, down conversion is performed once with respect to each of the band signals to obtain the intermediate frequency. During the reception, if the number of performing the down conversion increases, performance is deteriorated and power consumption is increased. However, in this embodiment, since the down conversion is performed only once, the above-described problems can be solved.

The first voltage control oscillator 131 may supply the oscillation signal to the first down converter 121. The oscillation signal supplied from the first voltage control oscillator 131 may be determined according to the first band signal that is supplied to the first down converter 121.

In this embodiment, the first down converter 121 may use the signal of $1540f_0$ as the first band signal in order to generate the intermediate frequency of $4f_0$, and the first voltage control oscillator 131 may use the signal of $1536f_0$.

The second voltage control oscillator 132 may supply the oscillation signal to the second down converter 122. The oscillation signal supplied from the second voltage control oscillator 132 may be determined according to the second band signal that is supplied to the second down converter 122.

In this embodiment, the second down converter 122 uses the signal of $1150f_0$ as the second band signal in order to generate the intermediate frequency of $12f_0$, and the second voltage control oscillator 132 may use the signal of $1162f_0$.

The first filter 141 may pass only frequencies within a desired range from the first intermediate frequency.

The first filter 141 may be a band-pass filter.

The second filter 142 may pass only frequencies within a desired range from the second intermediate frequency. The second filter 142 may be a band-pass filter.

The first analog-to-digital (AD) converter 151 may convert a signal filtered by the first filter into a digital signal.

The AD converter requires a sampling frequency to perform the conversion. The sampling frequency may be a frequency equal to an integer multiple of the intermediate frequency that is input to the AD converter.

In this embodiment, since the first intermediate frequency that is input to the first AD converter 151 is $4f_0$, a first sampling frequency that is input to the first AD converter 151 may be a frequency of $8f_0$, $12f_0$, or $16f_0$.

The second analog-to-digital (AD) converter 152 may convert the signal filtered by the second filter into a digital signal.

In this embodiment, since the second intermediate frequency that is input to the second AD converter 152 is $12f_0$, a second sampling frequency that is input to the second AD converter 152 may be a frequency of $24f_0$, $36f_0$, or $48f_0$.

The digital signals converted by the first and second AD converters may be transmitted to a signal processing unit (not shown).

The sampling frequency that is supplied to each of the first AD converter 151 and the second AD converter 152 may be generated by a clock generator.

The first and second AD converters 151 and 152 may be formed at a separate IC when the dual band receiver according to this embodiment is realized.

The clock generator 160 may receive the signal from the first voltage control oscillator and supply sampling frequencies corresponding to the integer multiples of the first and second intermediate frequencies to the first and second AD converters, respectively.

The clock generator 160 may be formed inside a phase locked loop (PLL) 171. Here, a detailed description of the phase locked loop will be omitted.

In this embodiment, frequency signals in the two bands are received, and sampling frequencies with respect to two center frequency signals can be supplied by using the one clock generator 160.

As described above, since different sampling frequencies are required for the first and second band signals, a plurality of sampling frequencies can be generated by using one clock generator in which a plurality of frequency dividers are appropriately arranged.

As such, according to the embodiment of the invention, since one clock generator can be used for the two band signals, the sampling frequencies fixed in the clock generator can be used by the second AD converter regardless of a change in frequency of a temperature crystal oscillator (TCXO).

The detailed embodiment of the clock generator will be described with reference to FIG. 2.

Figure 2:
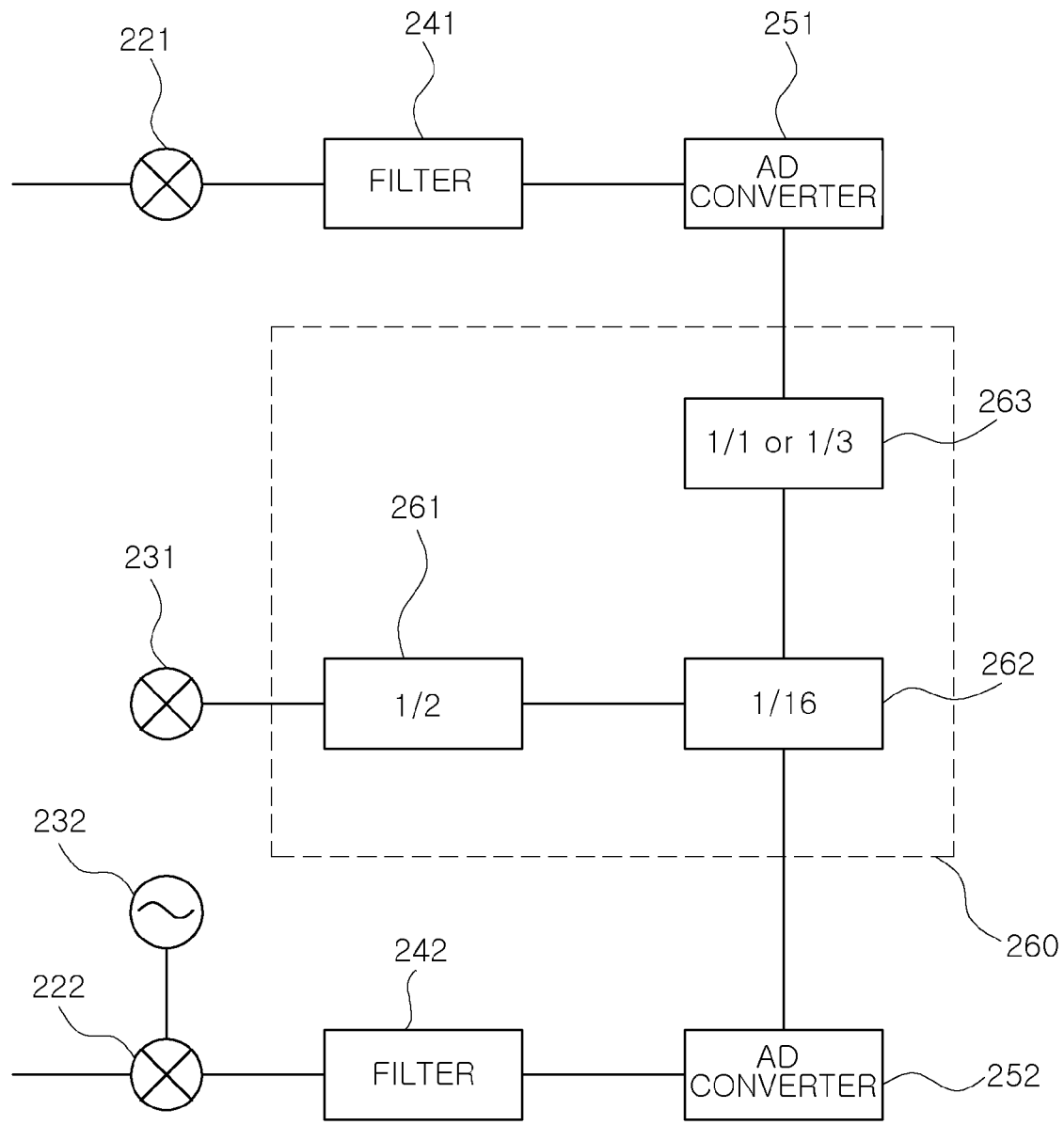
FIG. 2 is a circuit diagram illustrating a configuration of a clock generator in the dual band receiver according to the exemplary embodiment of the present invention.

FIG. 2 is a view illustrating a detailed example of a clock generator in a dual band receiver according to an exemplary embodiment of the present invention.

In FIG. 2, a phase locked loop and the peripheral configuration are removed in order to focus on the configuration and function of frequency dividers that constitute the clock generator.

Referring to FIG. 2, a clock generator 260 according to this embodiment may include a first frequency divider 261, a second frequency divider 262, and a third frequency divider 263.

The clock generator 260 uses an oscillation signal of one voltage control oscillator 231 to supply sampling frequencies to a first AD converter 251 and a second AD converter 252.

The clock generator 260 may be divided into a first frequency dividing unit and a second frequency dividing unit.

The first frequency dividing unit may supply a first sampling frequency to the first AD converter 251, and the second frequency dividing unit may supply a second sampling frequency to the second AD converter 252.

The first frequency dividing unit may include first, second, and third frequency dividers, and the second frequency dividing unit may include the first and second frequency dividers.

The first frequency dividing unit will be now described. Since the first to third frequency dividers 261, 262, and 263 are sequentially connected to each other, a frequency generated from the voltage control oscillator 231 may be changed into a sampling frequency equal to an integral multiple of the first intermediate frequency. In this embodiment, the first frequency divider 261 has a frequency division ratio of 1/2, the second frequency divider 262 has a frequency division ratio of 1/16, and the third frequency divider 263 has a frequency division ratio of 1/1 or 1/3.

In this embodiment, since the first voltage control oscillator 231 uses the frequency of $1536f_0$, if the frequency passes through the first to third frequency dividers, a sampling frequency of $16f_0$ or $48f_0$ may be generated. Since the intermediate frequency that is input to the first AD converter 251 is $4f_0$, the first sampling frequency that is input to the first AD converter 251 may be four or twelve times as much as the first intermediate frequency and be used for AD conversion.

The second frequency dividing unit will be described. Since the first and second frequency dividers 261 and 262 are sequentially connected, the frequency generated from the first voltage control oscillator 231 may be changed to a sampling frequency equal to an integer multiple of the second intermediate frequency. In this embodiment, the first frequency divider 261 has a frequency division ratio of 1/2, and the second frequency divider 262 may have a frequency division ratio of 1/16.

In this embodiment, since the first voltage control oscillator 231 uses the frequency of $1536f_0$, if the frequency passes through the first and second frequency dividers, a sampling frequency of $48f_0$ may be generated. Since the intermediate frequency that is input to the second AD converter 252 is $12f_0$, the second sampling frequency that is input to the second AD converter 252 is four times as much as the second intermediate frequency and may be used for AD conversion.

In this embodiment, as described above, the first frequency dividing unit and the second frequency dividing units are not separately formed, but the second frequency dividing unit is formed by using the frequency dividers that are arranged in the first frequency dividing unit. As such, the frequency dividers are arranged in one frequency dividing unit in order to generate first and second sampling frequencies. Therefore, the number of frequency dividers used can be reduced and the size of the receiver can be reduced. In this embodiment, the first frequency dividing unit and the second frequency dividing unit are formed by using the three frequency dividers. However, a plurality of frequency dividers may be arranged in various ways in order to generate sampling frequencies equal to integer multiples of the first intermediate frequency and the second intermediate frequency.

As set forth above, according to exemplary embodiments of the invention, a dual band receiver that can receive frequency signals used in a GPS and a Galileo system. At this time, since sampling frequencies with respect to frequency signals in two bands can be supplied by using one clock generator, constant sampling frequencies can be supplied regardless of a change in frequency of an external oscillator.

While the present invention has been shown and described in connection with the exemplary embodiments, it will be apparent to those skilled in the art that modifications and variations can be made without departing from the spirit and scope of the invention as defined by the appended claims.

What is claimed is:

1. A dual band receiver receiving frequency signals in different bands, the receiver comprising:
    a first down converter converting a first band signal into a first intermediate frequency signal;
    a second down converter converting a second band signal into a second intermediate frequency signal;
    a first voltage control oscillator supplying a first oscillation frequency to the first down converter;
    a second voltage control oscillator supplying a second oscillation frequency to the second down converter;
    a first filter passing the first intermediate frequency signal within a desired bandwidth;
    a second filter passing the second intermediate frequency signal within a desired bandwidth; and
    a clock generator converting the first oscillation frequency of the first voltage control oscillator into sampling frequencies corresponding to integer multiples of first and second oscillation frequencies and supplying the sampling frequencies to first and second AD converters, respectively.

2. The dual band receiver of claim 1, wherein the first band signal is an L1 band frequency signal used in a global positioning system (GPS), and
    the second band signal is an L5 band frequency signal used in a Galileo system.

3. The dual band receiver of claim 2, wherein the L1 band frequency signal is at 1540×1.023 MHz, and
    the L5 band frequency signal is at 1150×1.023 MHz.

4. The dual band receiver of claim 2, wherein one of the first intermediate frequency and the second intermediate frequency is equal to an integer multiple of the other intermediate frequency.

5. The dual band receiver of claim 2, wherein the first oscillation frequency is at 1536×1.023 MHz, and
    the second oscillation frequency is at 1162×1.023 MHz.

6. The dual band receiver of claim 2, wherein the first intermediate frequency is 4×1.023 MHz, and
    the second intermediate frequency is at 12×1.023 MHz.

7. The dual band receiver of claim 2, wherein the clock generator comprises:
    a first frequency dividing unit generating a sampling frequency to be input to the first AD converter; and
    a second frequency dividing unit generating a sampling frequency to be input to the second AD converter.

8. The dual band receiver of claim 7, wherein the second frequency dividing unit forms a part of the first frequency dividing unit.

9. The dual band receiver of claim 8, wherein the first frequency dividing unit comprises a first frequency divider, a second frequency divider, and a third frequency divider sequentially connected to each other, and
    the second frequency dividing unit comprises the first frequency divider and the second frequency divider.

10. The dual band receiver of claim 9, wherein the first frequency divider has a frequency division ratio of 1/2, the second frequency divider has a frequency division ratio of 1/16, and the third frequency divider has a frequency division ratio of 1/3 or 1/1.

11. The dual band receiver of claim 2, wherein the first intermediate frequency is at 4×1.023 MHz, and the second intermediate frequency is at 12×1.023 MHz; and
the clock generator comprises the first, second, and third frequency dividers sequentially connected to each other, the first to third frequency dividers generate a sampling frequency input to the first AD converter, and the first and second frequency dividers generate a sampling frequency input to the second AD converter.

12. The dual band receiver of claim 11, wherein the first frequency divider has a frequency division ratio of 1/2, the second frequency divider has a frequency division ratio of 1/16, and the third frequency divider has a frequency division ratio of 1/3 or 1/1.

* * * * *